United States Patent
Raman

(10) Patent No.: US 10,455,047 B2
(45) Date of Patent: Oct. 22, 2019

(54) METHODS AND SYSTEMS FOR APPLICATION CONTROLLED PRE-FETCH

(71) Applicant: PayPal, Inc., San Jose, CA (US)

(72) Inventor: Srinivasan Raman, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/832,702

(22) Filed: Dec. 5, 2017

(65) Prior Publication Data

US 2018/0167484 A1    Jun. 14, 2018

Related U.S. Application Data

(63) Continuation of application No. 14/550,757, filed on Nov. 21, 2014, now Pat. No. 9,838,499, which is a continuation of application No. 13/677,163, filed on Nov. 14, 2012, now Pat. No. 8,930,632.

(51) Int. Cl.
*G06F 12/00* (2006.01)
*H04L 29/08* (2006.01)
*G06F 16/957* (2019.01)
*G06F 12/0862* (2016.01)
*H04L 29/06* (2006.01)

(52) U.S. Cl.
CPC ...... *H04L 67/2847* (2013.01); *G06F 12/0862* (2013.01); *G06F 16/9574* (2019.01); *H04L 67/42* (2013.01); *G06F 2212/6024* (2013.01)

(58) Field of Classification Search
CPC . H04L 67/2847; H04L 67/42; H04L 12/5689; G06F 12/0802; G06F 12/0862; G06F 12/0866; G06F 17/30902; G06F 2212/602; G06F 2212/6022; G06F 2212/6024; G06F 2212/6026; G06F 2212/6028
See application file for complete search history.

(56) References Cited

U.S. PATENT DOCUMENTS 7,975,025 B1 * 7/2011 Szabo ............... G06F 17/30902
709/203

* cited by examiner

*Primary Examiner* — Shawn X Gu
(74) *Attorney, Agent, or Firm* — Maschoff Brennan

(57) ABSTRACT

Methods and systems for application controlled pre-fetch are described. The system receives pre-fetch information, over a network, at a first load balancer. The pre-fetch information is received from a first application server and includes a plurality of element identifiers that respectively identify a plurality of interface elements included in an interface. The system identifies a first element identifier from the plurality of element identifiers in the pre-fetch information. The first element identifier identifies a first interface element. The system retrieves the first interface element by communication of a request to a second application server. The request includes the first element identifier.

20 Claims, 8 Drawing Sheets

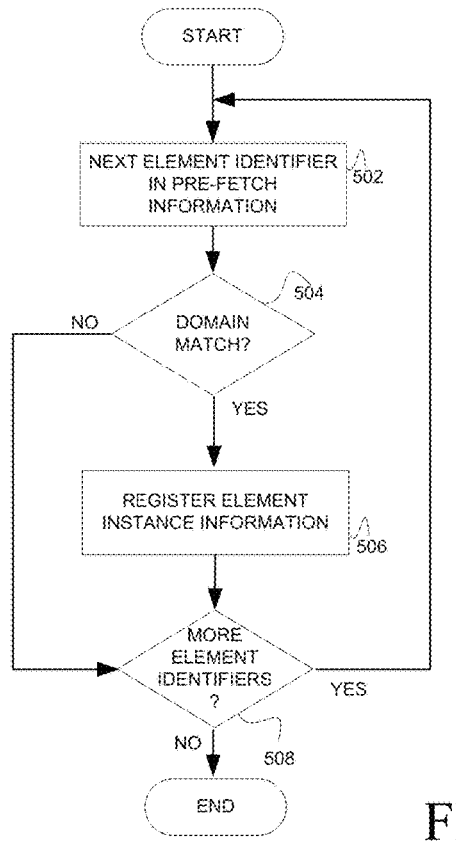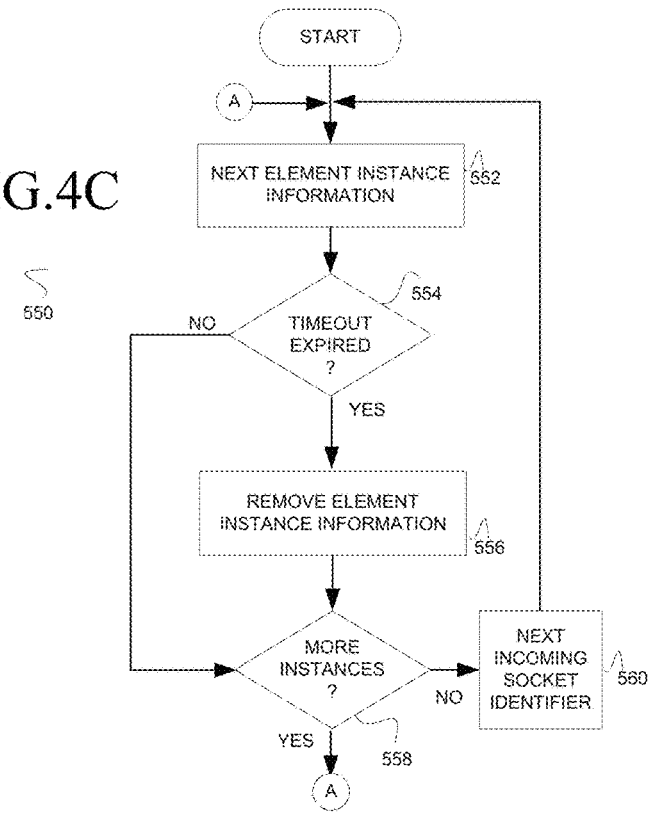
FIG.4B
FIG.4C

METHODS AND SYSTEMS FOR APPLICATION CONTROLLED PRE-FETCH

CROSS-REFERENCE TO RELATED APPLICATIONS

This application is a continuation of U.S. patent application Ser. No. 14/550,757, filed on Nov. 21, 2014, now U.S. Pat. No. 9,838,499, issued Dec. 5, 2017; which is a continuation of U.S. patent application Ser. No. 13/677,163, filed on Nov. 14, 2012, now U.S. Pat. No. 8,930,632, issued Jan. 6, 2015; the disclosures of both of these applications and patents are incorporated by reference herein.

TECHNICAL FIELD

This disclosure relates to methods and systems supporting data communication systems. More particularly, methods and systems for application controlled pre-fetch are described.

RELATED ART

A user may operate a client machine to retrieve an interface from a network device. In some instances, the interface may include element identifiers that identify interface elements that are further retrieved before the interface is displayed.

BRIEF DESCRIPTION OF THE DRAWINGS

Embodiments are illustrated by way of example and not limitation in the figures of the accompanying drawings, in which:

FIG. 4B illustrates a flowchart of a method to identify pre-fetch information for a load balancer server;

FIG. 4C illustrates a flowchart of a method to remove element instance information, according to an embodiment;

DETAILED DESCRIPTION

In the following description, for purposes of explanation, numerous specific details are set forth in order to provide a thorough understanding of some example embodiments. It will be evident, however, to one of ordinary skill in the art, that embodiments of the present disclosure may be practiced without these specific details.

As described further below, according to various example embodiments of the disclosed subject matter described and claimed herein, methods and systems for application controlled pre-fetch are provided. Various embodiments are described below in connection with the figures provided herein.

Figure 1:
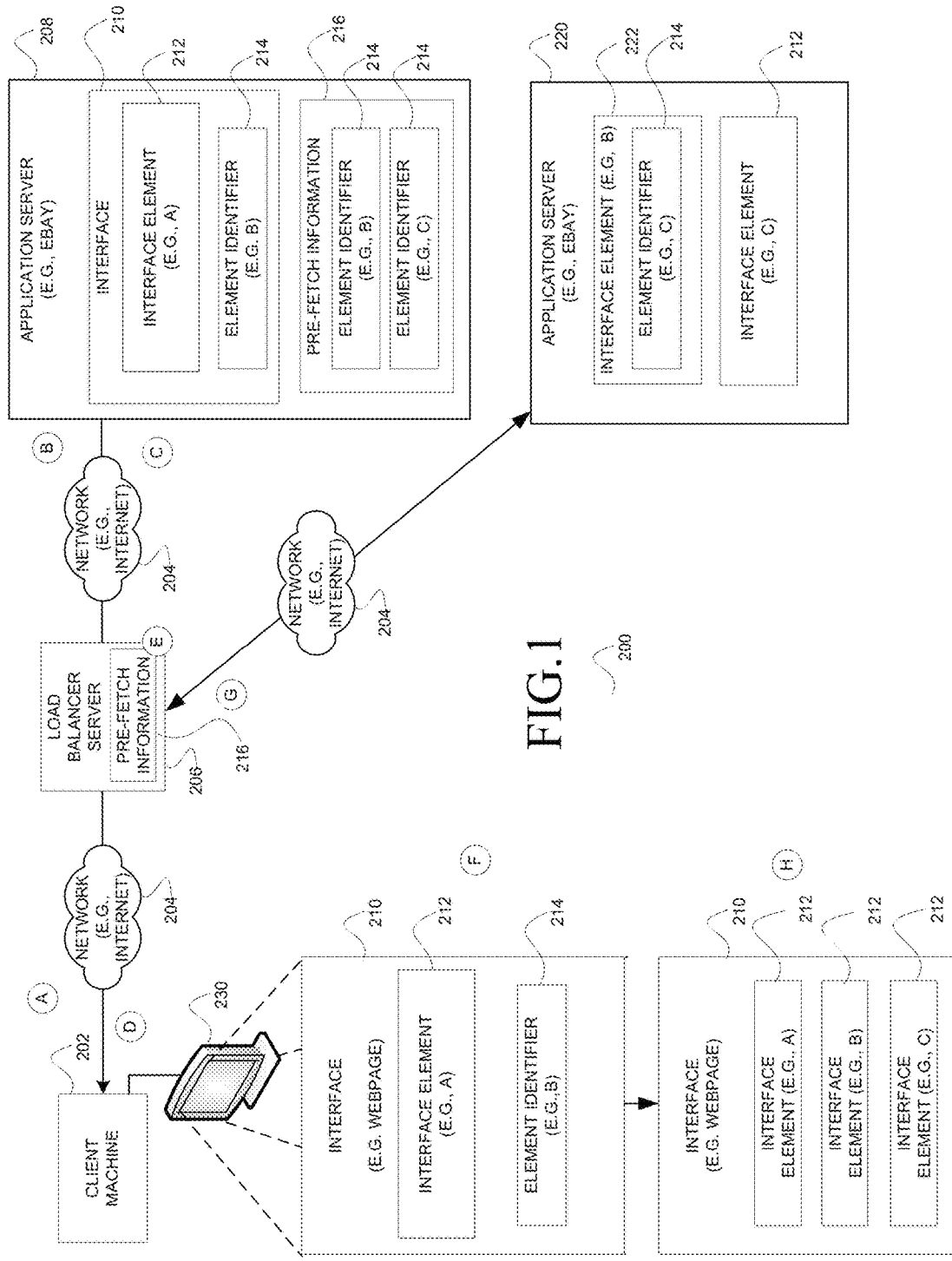
FIG. 1 illustrates a system for application controlled pre-fetch, according to an embodiment.

FIG. 1 illustrates a system for application controlled pre-fetch, according to an embodiment. Broadly, at operation A, a client machine 202 may communicate a request to a network entity for an interface 210 (e.g., web interface). The interface 210 and the network entity may be identified with a universal resource locater (URL). For example, the client machine 202 may communicate the request over a network 204 (e.g., Internet) to a load balancer server 206 that, in turn, communicates or routes the request over the network 204 to an application server 208. At operation B, the application server 208 may receive the request and respond by generating the interface 210 (e.g., web interface) and pre-fetch information 216. The pre-fetch information 216 may include element identifiers 214 (e.g., URLs) that identify interface elements 212 (e.g., B and C) and their location on the network 204. The pre-fetch information 216 facilitates retrieval of interface elements 212 (e.g., B and C) by providing immediate access to the element identifiers 214 that may otherwise be nested inside of interface elements 212 on the interface 210. For example, the interface 210 is shown to include a first element identifier in the form of element identifier 214 (e.g., element identifier—B) that identifies a first element (e.g., B) in the form of an interface element 222 (e.g., script file), as shown on application server 220, that further includes an element identifier 214 (e.g., element identifier—C) that identifies a second element (e.g., element C) in the form of an interface element 212 (e.g., Joint Photographic Experts Group (JPEG file)), as further shown on application server 220. Nesting is not limited and may be N levels deep. Nesting may require serial retrieval of interface elements 212 by the client machine 202 before the client machine 202 may display the interface 210. In contrast, generation and utilization of pre-fetch information 216 provides immediate access to an element identifier 214 that otherwise may be nested inside an interface element 212 and not immediately available for retrieval. Accordingly, the pre-fetch information 216, as described further below, facilitates the efficient retrieval of interface elements 212 by enabling retrieval of otherwise hidden interface elements 212 and enabling retrieval of interface elements 212 in parallel.

At operation C, the application server 208 may communicate the interface 210 and the pre-fetch information 216 to the load balancer server 206. At operation E, the load balancer server 206 may receive the interface 210 and the pre-fetch information 216. Further, at operation E, the load balancer server 206 may communicate the interface 210 to the client machine 202 and store the pre-fetch information 216 in a local cache (not shown). The interface 210, as received by the client machine 202 from the load balancer server 206, is shown to include an interface element 212 for an interface element A (e.g., item description) that is readily displayable and an element identifier 214 that may be used to retrieve an interface element B (e.g., merchandizing widget). The interface element 212 in the form of an item description may be text, a graphic, a picture or any other form of digital content that may be included on a digital interface. The element identifier 214 for the element B may, for example, be embodied as a uniform resource locator (URL) or any other identifier that may be utilized to retrieve, via the network 204, the corresponding interface element 212 from a remote server.

At operation G, the load balancer server 206 may utilize the pre-fetch information 216 to pre-fetch interface elements 212. The load balancer server 206 may pre-fetch the interface elements in anticipation of receiving requests for interface elements 212 (e.g., B) from the client machine 202. The load balancer server 206 selectively pre-fetches interface elements 212. For example, the load balancer server 206 may pre-fetch only interface elements 222 associated with element identifiers 214 that include a domain that is associated with the load balancer server 206. For example, the load balancer server 206 may identify whether any of the element identifiers 214 in the pre-fetch information 216 matches one or more domains in the URL that is associated with the original request and, if so, performs a per-fetch operation by communicating requests for the identified interface elements 212. For example, the load balancer server 206 may communicate requests to the application server 220 based on the matching element identifiers 214 to retrieve the corresponding interface elements 212 (e.g., B and C) from the application server 220.

At operation D, the client machine 202 may receive the interface 210 and, at operation F, may utilize the element identifiers 214 in the interface 210 to request interface elements 212 that are external to the interface 210. For example, the client machine 202 may retrieve the interface element 212 (e.g., B) from the load balancer server 206. In some instances, the retrieved interface element 212 may also include an element identifier 214 that is further retrieved by the client machine 202. In the present example, the client machine 202 receives the interface element B (e.g., script), identifies an element identifier 214 for the interface element C (e.g., Joint Photographic Experts Group (JPEG file)) in the script and utilizes the element identifier 214 to retrieve the interface element C from the load balancer server 206. The above processing may be iterated until the entire set of interface elements 212 in the interface 210 are retrieved by the client machine 202. At operation H, the client machine 202 identifies the entire set of interface elements 212 as being retrieved and displays the interface 210 on the monitor 230. Accordingly, the application server 208 controls the pre-fetch of interface elements 212 at the load balancer server 206 via the generation, distribution, and utilization of pre-fetch information 216.

Figure 2A:
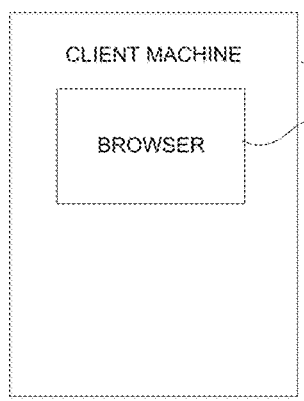
FIG. 2A illustrates a client machine, according to an embodiment.

FIG. 2A illustrates a client machine 202, according to an embodiment. The client machine 202 may include a browser 300, such as the Internet Explorer browser developed by Microsoft Corporation of Redmond, Washington State). The browser 300 may be utilized to request and display an interface.

Figure 2B:
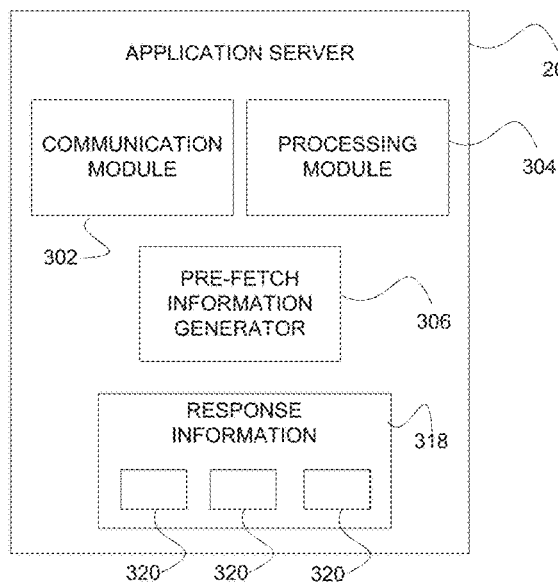
FIG. 2B illustrates an application server, according to an embodiment.

FIG. 2B illustrates an application server 208, according to an embodiment. The application server 208 may include a communication module 302, a processing module 304, a pre-fetch information generator 306, and response information 328. The communication module 302 may be utilized to receive requests, interact with the processing module 304, and generate and communicate responses 320 over a network 204. The request may include a request for an interface 210 (not shown) and the response may include the interface 210 and the pre-fetch information 216. The processing module 304 may be utilized to generate the interface 210 (not shown). The pre-fetch information generator 306 may be utilized to generate pre-fetch information 216, as previously described. The response information 318 may temporarily store responses 320 that have been generated by application server 208 for communication to the client machine 202 via the load balancer server 206.

Figure 2C:
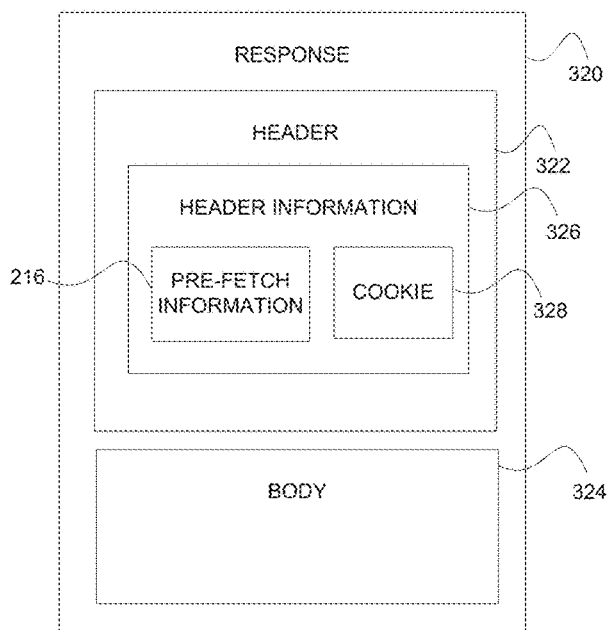
FIG. 2C illustrates a response, according to an embodiment.

FIG. 2C illustrates a response 320, according to an embodiment. The response 320 may include a Hypertext Transfer Protocol (HTTP) response in some embodiments. The response 320 may include a header 322 and a body 324. The header 322 may include header information 326 that includes pre-fetch information 216, as previously described, and one or more cookies 328.

Figure 3A:
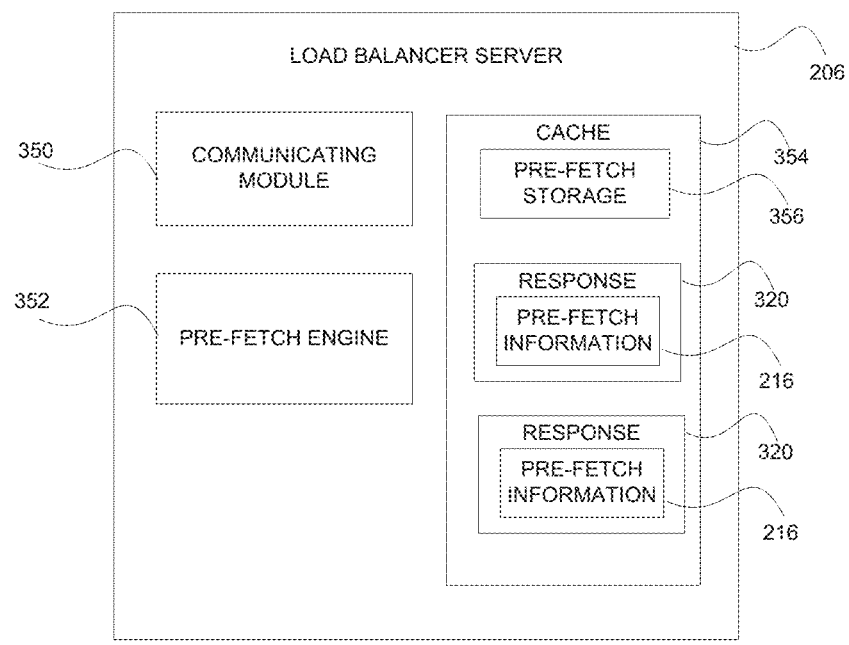
FIG. 3A illustrates load balancer server, according to an embodiment.

FIG. 3A illustrates load balancer server 206, according to an embodiment. The load balancer server 206 may include a communicating module 350, a pre-fetch engine 352 and a cache 354. The cache 354 may include pre-fetch storage 356 and store one or more responses 320 that respectively include pre-fetch information 216. In some embodiments the cache 354 may be a separate physical component that is communicatively shared by multiple load balancers 206. The communicating module 350 may be utilized to receive a request for the interface 210 (not shown) from a client machine 202, route the request to an application server 208, receives a response 320 from the application server 208 that includes an interface 210, interact with the pre-fetch engine 352 to identify and initiate pre-fetching of the interface elements 212 based on pre-fetch information 216 in the response 320, and communicate the response 320 to the client machine 202. The response 320 may include the interface 210 (not shown), pre-fetch information 216 and one or more cookies 328 (not shown). The pre-fetch engine 352 may process the pre-fetch information 216 in the response 320 to pre-fetch (e.g., retrieve) an interface element 212 (not shown) from a remote server based on element identifiers 214 that are included in the pre-fetch information 216 and to store the interface element 212 and an associated cookie 328 (e.g., not shown) in the pre-fetch storage 356. The pre-fetch engine 352 may utilize element identifiers 214 in the pre-fetch information 216 to selectively retrieve zero or more interface elements 212 (not shown) from a remote server. For example, if the pre-fetch engine 352 identifies an element identifier 214 in the pre-fetch information 216 that includes a domain that matches a domain included in the original request for the interface 210 then the pre-fetch engine 352 communicates a request for the element identifier 214 to the appropriate application server 208. Finally, the pre-fetch engine 352 may store the requested interface element 212 in the pre-fetch storage 356 in anticipation of a subsequent retrieval by the client machine 202. In some embodiments the pre-fetch storage 356 may be located outside the load balancer server 206 and/or shared by multiple load balancer servers 206.

Figure 3B:
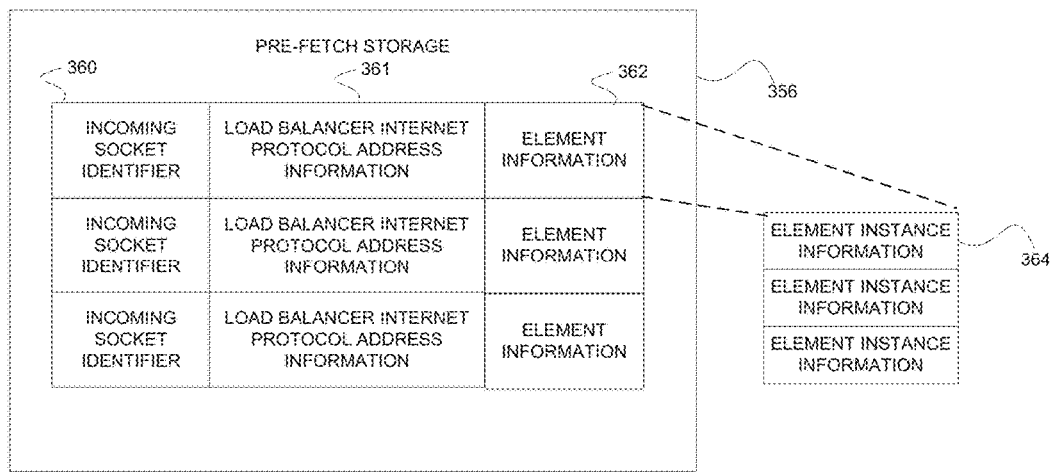
FIG. 3B illustrates pre-fetch storage, according to an embodiment.

FIG. 3B illustrates pre-fetch storage 356, according to an embodiment. The pre-fetch storage 356 may be used to store an array of incoming socket identifiers 360, load balancer internet protocol address information 361 and element information 362. Each row of the pre-fetch storage 356 corresponds to a request that was received at the load balancer server 206 that originated in a session at a client machine 202, as identified by the incoming socket identifier 360. The element information 362 may include one or more entries of element instance information 364. Each entry of element instance information 364 corresponds to an interface element 212 that may be pre-fetched by the load balancer server 206 from a remote server. Accordingly, the organization of the pre-fetch storage 356 accommodates multiple requests for interfaces 210 for respective sessions that are facilitated by client machines 202. Further, the organization of the pre-fetch storage 356 accommodates an association of multiple pre-fetch operations for each request for an interface 210.

Figure 3C:
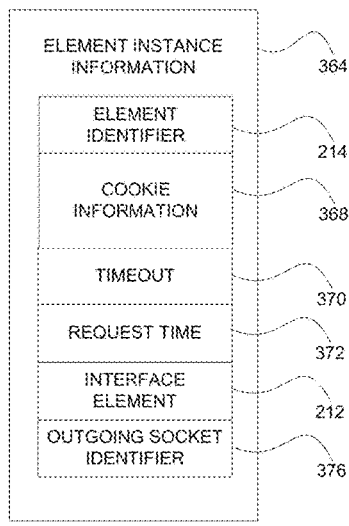
FIG. 3C illustrates element instance information, according to an embodiment.

FIG. 3C illustrates element instance information 364, according to an embodiment. The element instance information 364 corresponds to an interface element 212 that may be pre-fetched by the load balancer server 206. The element instance information 364 may include an element identifier 214, cookie information 368, a timeout 370, a request time 372, an interface element 212 and an outgoing socket identifier 376. The element identifier 214 identifies the interface element 212 and the location of the interface element 212 on the network 204. For example, the element identifier 214 may include a URL. The timeout 370 may be utilized to remove the element instance information 364 upon expiration of the timeout 370 in the absence of a response 320. The request time 372 may identify the time at which the load balancer server 206 requested the interface element 212 from the application server 208.

Figure 3D:
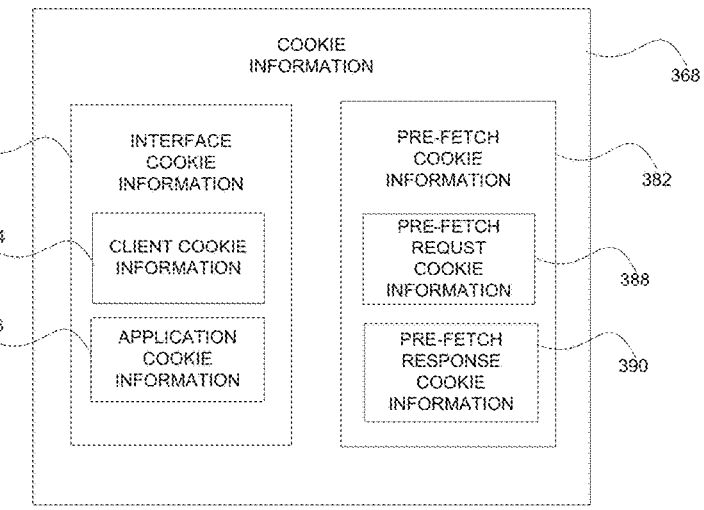
FIG. 3D illustrates cookie information, according to an embodiment.

FIG. 3D illustrates cookie information 368, according to an embodiment. The cookie information 368 is associated with particular element instance information 364 and may include interface cookie information 380 and pre-fetch cookie information 382. The interface cookie information 380 may be utilized to store cookies that are associated with retrieval of an interface 210. For example, the load balancer server 206 may receive a request from a client machine 202 for an interface 210 that is forwarded by the load balancer server 206 to an application server 208 which, in turn, communicates a response back to the load balancer server including the interface 210 that, in turn, communicates the response back to the client machine 202. To this end, the interface cookie information may include client cookie information 384 and application cookie information 386. The client cookie information 384 may be utilized to store one or more cookies that are received at the load balancer server 206 in the request from the client machine 202. The application cookie information 386 may be utilized to store one or more cookies that are received at the load balancer server 206 in the response from the application server 208.

The pre-fetch cookie information 382 may be utilized to store cookies that are associated with the pre-fetch of an interface element 212. For example, the load balancer server 206 may request an interface element 212 from an application server 208 which, in turn, communicates a response back to the load balancer server 206. To this end, the pre-fetch cookie information 382 may include pre-fetch request cookie information 388 and pre-fetch response cookie information 390. The pre-fetch request cookie information 388 includes one or more cookies that may be identified/generated by the pre-fetch engine 352, as described later in this document, and subsequently communicated by the load balancer server 206 in a request to an application server 208 for an interface element 212. The pre-fetch response cookie information 390 may be utilized to store one or more cookies that are received at the load balancer server 206 in the corresponding pre-fetch response from the application server 208. The pre-fetch response cookie information 390 may be communicated to a client machine 202 in response to a request for the corresponding interface element 212.

FIGS. 4A-4D illustrates flowcharts of methods for application controlled pre-fetch, according to an embodiment.

Figure 4A:
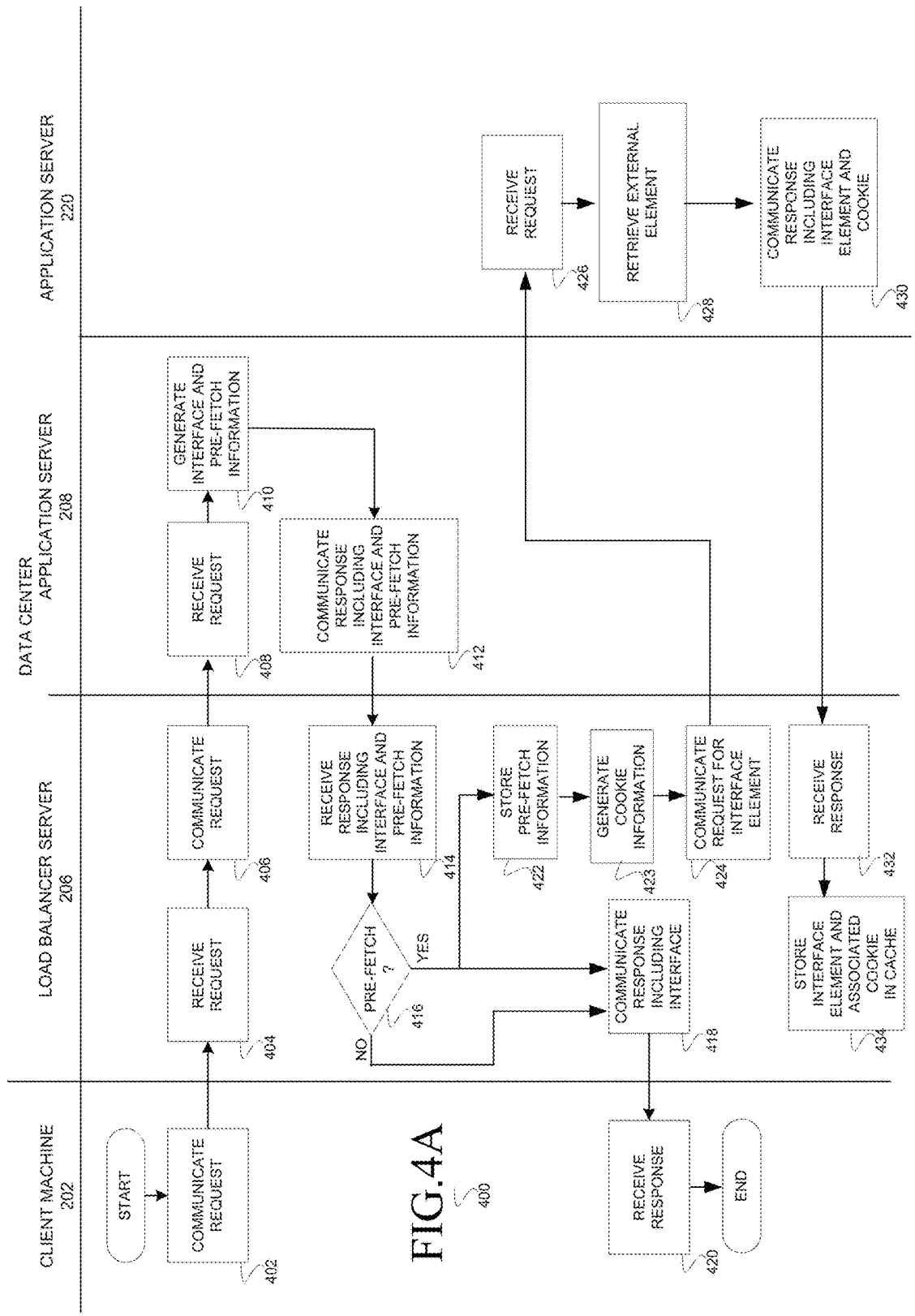
FIG. 4A illustrates a swim lane flowchart of a method for application controlled pre-fetch, according to an embodiment.

FIG. 4A illustrates the method 400 for application controlled pre-fetch, according to an embodiment. Illustrated on the left are operations performed on a client machine 202 and illustrated on the right are operations performed at a data center that may operate under the control of a single entity. Illustrated on the left of the data center are operations performed by a load balancer server 206; illustrated in the middle are operations performed by an application server 208; and illustrated on the right are operations performed by an application server 220. The method 400 may commence at operation 402, at the client machine 202, with a user selecting a user interface element 212 that is received by a browser 300 that, in turn, generates a request for the interface 210 (e.g., web page), and communicates the request over a network 204 (e.g., Internet) to the load balancer server 206. For example, the request may include a URL that identifies the interface 210 and the application server 208 from which the interface 210 is to be retrieved and zero or more cookies.

At operation 404, at the load balancer server 206, the communicating module 350 may receive the request and store the received zero or more cookies as client cookie information 384 in the interface cookie information 380. At operation 406, the load balancer server 206 may communicate the request to the application server 208 based on the URL in the request. The request may include the zero or more cookies as received from the client machine 202.

At operation 408, at the application server 208, the communication module 302 may receive the request including the zero or more cookies and at operation 410 generate the interface 210. For example, the interface 210 may include interface elements 212 and element identifiers 214 that identify interface elements 212 that include additional element identifiers 214 which are not immediately exposed by the interface 210. Further at operation 410, the pre-fetch information generator 306 may generate pre-fetch information 216 for the interface 210. For example, the pre-fetch information 216 may generate element identifiers 214 for interface elements 212 that are referenced by the interface 210 and not included in the interface 210. Accordingly, the pre-fetch information 216 may provide access to element identifiers 214 that are included in the interface 210 and nested inside of one or more interface elements 212. At operation 412, the communication module 302 may communicate a response 320 to the load balancer server 206. The response 320 may include the interface 210, the pre-fetch information 216 for the interface 210, and zero or more cookies.

At operation 414, at the load balancer server 206, the communicating module 350 may receive the response 320 including the zero or more cookies and store the cookies as application cookie information 386 in the interface cookie information 380. At decision operation 416 the pre-fetch engine 352 may identify whether one or more pre-fetch operations are to be performed as further described in method 500 on FIG. 4B. If the pre-fetch engine 352 identifies one or more pre-fetch operations are to be performed then a branch is made to operations 422 and 418 which may be performed concurrently. Otherwise a branch is made to operation 418. At operation 418, the communicating module 350 may communicate the response 320 to the client machine 202. The response 320 may include the interface 210 and an indication to keep-alive the connection between the client machine 202 and the load-balancer server 206. The connection may be kept-alive responsive to the load balancer server 206 identifying a pre-fetch is to be performed for at least one interface element 212 on the interface 210.

At operation 420, the client machine 202 may receive the response 320.

At operation 422, the pre-fetch engine 352 may store the response 320 including the pre-fetch information 216 that is identified for pre-fetch in the cache 354. At operation 423, the pre-fetch engine 352 may generate pre-fetch request cookie information 388. The pre-fetch engine 352 may generate the pre-fetch request cookie information based on the client cookie information 384 and the application cookie information 386. If a cookie is present in both the client cookie information 384 and the application cookie information 386 then the pre-fetch engine 352 copies the cookie and associated values from the application cookie information 386 to the pre-fetch request cookie information 388. If a cookie is present only in the application cookie information 386 then the pre-fetch engine 352 copies the cookie from the application cookie information 386 to the pre-fetch request cookie information 388. If a cookie is marked in the application cookie information 386 as deleted then the pre-fetch engine 352 does not copy the cookie to the pre-fetch request cookie information 388. If a cookie is present in the client cookie information 384 but not in the application cookie information 386 then pre-fetch engine 352 copies the cookie from the client cookie information 384 to the pre-fetch request cookie information 388.

At operation 424, the communicating module 350 may pre-fetch an interface element 212 by communicating a request for the interface element 212 to the application server 220. For example, the communicating module 350 may communicate the request based on an element instance information 364 entry that is associated with a particular interface element 212, initialize the request time 372 and store an outgoing socket identifier 376 in the element instance information 364. It will be appreciated that the communicating module 350 may pre-fetch more than one interface element 212 from the application server 220. Further, it will be appreciated that the communicating module 350 may pre-fetch one or more interface elements 212 from other application servers not shown in FIG. 4B. The request may include the pre-fetch request cookie information 388 (e.g., one or more cookies) associated with the present element interface information 364.

At operation 426, at the application server 220, the communication module 302 may receive the request. The request may include the element identifier 214 for the interface element 212 that is being requested. At operation 428, the processing module 304 may retrieve the interface element 212 based on the request and, at operation 430, the communication module 302 may communicate a response 320 to the load balancer server 206. The response 320 may include the interface element 212 and zero or more cookies 328. It will be appreciated that pre-fetch operations as described herein may have a cascading effect. For example, the retrieval of an interface element 212 at operation 428 or any other retrieval of an interface element 212 may be associated with additional pre-fetch operations.

At operation 432, at the load balancer server 206, the communicating module 350 may receive a response 320. The response may include the requested interface element 212 and zero or more cookies. At operation 434, the communicating module 350 may store the interface element 212 and the associated zero or more cookies in the pre-fetch response cookie information 390 of the appropriate element instance information 364 based on the outgoing socket identifier 376.

FIG. 4B illustrates a flowchart of a method 500 to identify pre-fetch information 216 for a load balancer server 206, according to an embodiment. The method 500 corresponds to operation 416 on FIG. 4A. The method 500 may commence at operation 502 with the pre-fetch engine 352 identifying the next element identifier 214 in the pre-fetch information 216. At operation 504, the pre-fetch engine 352 may identify whether the element identifier 214 is for the same domain as the initial request received from the client machine 202. For example, the pre-fetch engine 352 may identify whether the URL that identifies the interface element 212 that is targeted for pre-fetch matches the domain in the URL that targets the corresponding interface 210 received by the load balancer server 206 in the initial request from the client machine 202. If the element identifier 214 (e.g., URL) of the interface element 212 matches then processing continues at operation 506. Otherwise a branch is made to decision operation 508. At operation 506, the pre-fetch engine 352 may register an element instance information 364 entry in the pre-fetch storage 356. For example, the pre-fetch engine 352 may add element instance information 364 entry to the element information 362 that is associated with the incoming socket identifier 360 that is associated with the pre-fetch information 216. Further, the pre-fetch engine 352 may copy the element identifier 214 from the pre-fetch information 216 into the element instance information 364 and initialize the timeout 370 in the element instance information 364. Further, the pre-fetch engine 352 may copy the zero or more cookies from response 320 into the application cookie information 386 in the interface cookie information 380. Moreover, if an entry in the pre-fetch storage 356 has not been entered then the pre-fetch engine 352 registers the entry and initializes the incoming socket identifier 360 and load balancer internet protocol address information 361 associated with the request for the interface 210.

At decision operation 508, the pre-fetch engine 352 may identify whether more element identifiers 214 are present in the pre-fetch information 216. If more element identifiers 214 are present then a branch is made to operation 502. Otherwise the process ends.

FIG. 4C illustrates a flowchart of a method 550 to remove element instance information 364 from pre-fetch storage 356, according to an embodiment. The method 550 may commence at operation 552 with the pre-fetch engine 352 identifying the next element instance information 364 in element information 362 in the pre-fetch storage 356. Recall that element information 362 in the pre-fetch storage 356 is associated with an incoming socket identifier 360 that is further associated with a request that is received from a client machine 202. At decision operation 554, the pre-fetch engine 352 may identify whether the element instance information 364 includes a timeout 370 that is expired. If the element instance information 364 includes a timeout 370 that is expired then then processing continues at operation 556. Otherwise a branch is made to decision operation 558. At operation 556, the pre-fetch engine 352 may remove the element instance information 364 entry from the pre-fetch storage 356. At decision operation 558, the pre-fetch engine 352 may identify whether more element instance information 364 entries are present in the element information 362. If more element instance information 364 is present then a branch is made to operation 552. Otherwise the processing continues to operation 560. At operation 560, the pre-fetch engine 352 identifies the next incoming socket identifier 360 in the pre-fetch storage 356.

Figure 4D:
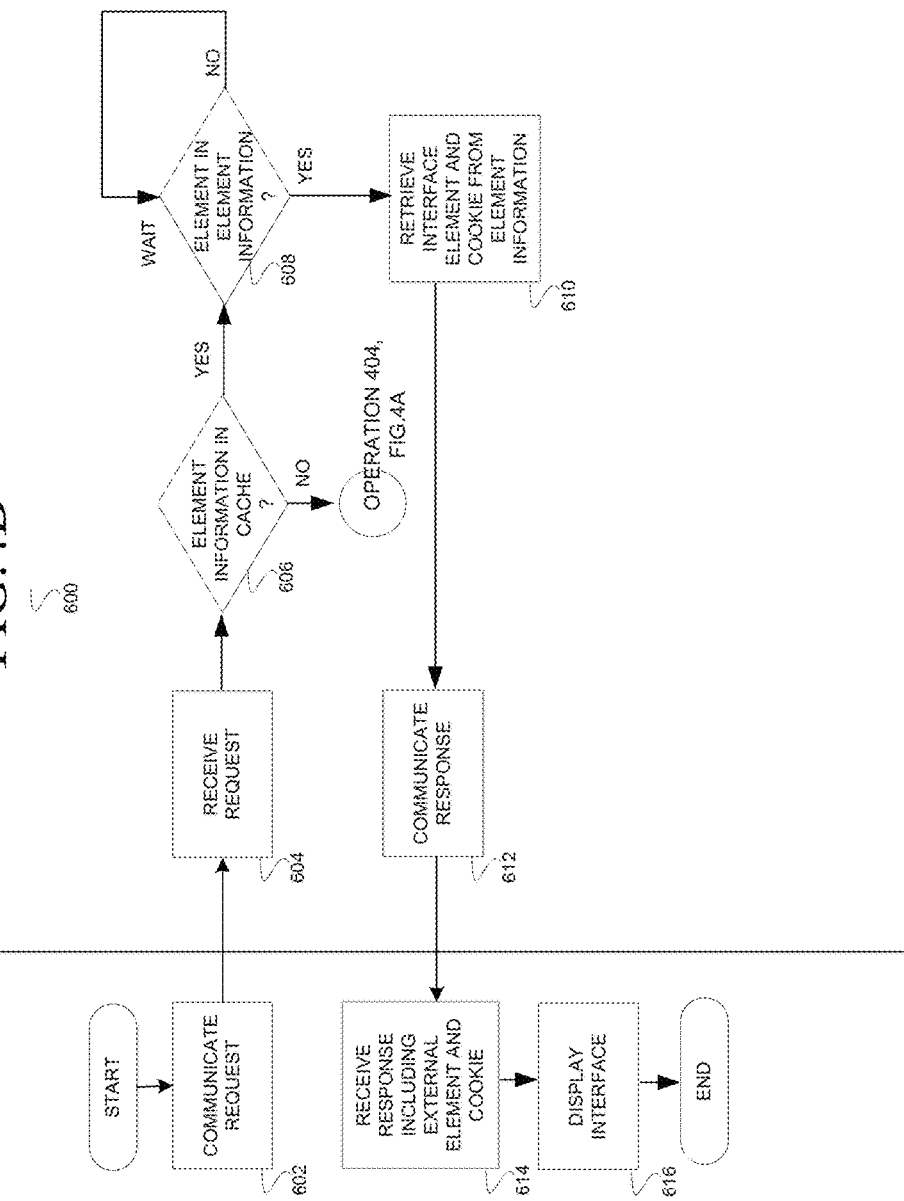
FIG. 4D illustrates a flowchart of a method for a client machine to retrieve an interface element, according to an embodiment.

FIG. 4D illustrates a flowchart of a method 600 for a client machine 202 to retrieve an interface element 212, according to an embodiment. Illustrated on the left are operations performed by a client machine 202 and illustrated on the right are operations performed by a load balancer server 206. The method 600 may commence at operation 602 with a browser 300 at the client machine 202 communicating a request for an interface element 212 to a load balancer server 206. The browser 300 may be utilizing an element identifier 214 that was identified in an interface 210 that was previously returned by the load balancer server 206 to the client machine 202.

At operation 604, at the load balancer server 206, the communicating module 350 may receive the request. At decision operation 606, the pre-fetch engine 352 may identify whether the cache 354 includes element information 362 based on the request. For example, the pre-fetch engine 352 may match an incoming socket identifier 360 that is associated with the request to an incoming socket identifier 360 in the pre-fetch storage 356 that is associated with the element information 362. In another embodiment the pre-fetch engine 352 may match the URL of the request received from the client machine 202 with the URL of the element identifier 214. If a match is found then processing continues at decision operation 608. Otherwise processing may continue on operation 404 of FIG. 4A. At decision operation 608 the pre-fetch engine 352 may identify whether the load balancer server 206 has retrieved and stored the requested interface element 212 in the element instance information 364. If the interface element 212 was retrieved (e.g., identified as stored in the element instance information 364) then processing continues at operation 610. Otherwise the process waits by continuing at decision operation 606 after waiting for a predetermined period of time. At operation 610, the pre-fetch engine 352 may retrieve the interface element 212 and the associated zero or more cookies from the element instance information 364. For example, the pre-fetch engine 352 may retrieve the zero or more cookies from the pre-fetch response cookie information 390 in the pre-fetch cookie information 382. At operation 612 the communicating module 350 may communicate a response 320 that includes the interface element 212 and the associated pre-fetch response cookie information 390 to the client machine 202.

At operation 614, at the client machine 202, the browser 300 may receive the response 320 including the interface 210 and the cookie 328 and at operation 616 display the interface 210 responsive to identifying that all of the interface elements 212 are retrieved.

Example Machine Architecture and Machine-Readable Medium

Figure 5:
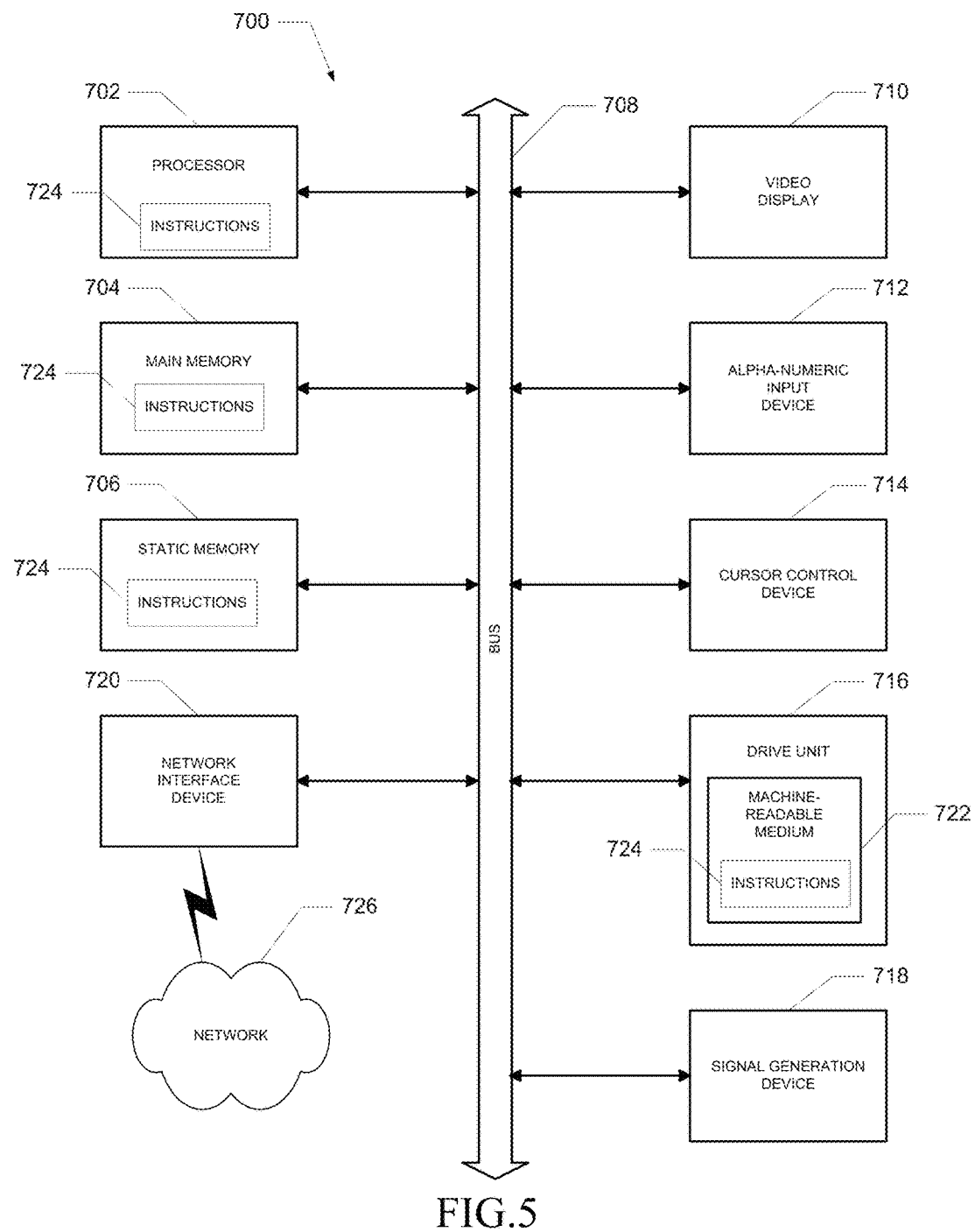
FIG. 5 shows a diagrammatic representation of a machine in the form of a computer system within which a set of instructions, for causing the machine to perform any one or more of the methodologies discussed herein, may be executed, according to an example embodiment.

FIG. 5 is a block diagram of machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor-control device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Modules, Components and Logic

Certain embodiments are described herein as including logic or a number of hardware or software components, modules, or mechanisms. A computer hardware module is tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a computer hardware module that operates to perform certain operations as described herein.

In various embodiments, a computer hardware module may be implemented mechanically or electronically. For example, a computer hardware module may comprise dedicated circuitry or logic that is permanently configured (e.g., as a special-purpose processor) to perform certain operations. A computer hardware module may also comprise programmable logic or circuitry (e.g., as encompassed within a general-purpose processor or other programmable processor) that is temporarily configured by software to perform certain operations. It will be appreciated that the decision to implement a computer hardware module mechanically, in dedicated and permanently configured circuitry, or in temporarily configured circuitry (e.g., configured by software) may be driven by cost and time considerations.

Accordingly, the term "computer hardware module" should be understood to include a tangible entity, be that an entity that is physically constructed, permanently configured (e.g., hardwired) or temporarily configured (e.g., programmed) to operate in a certain manner and/or to perform certain operations described herein. Considering embodiments in which computer hardware modules are temporarily configured (e.g., programmed), each of the computer hardware modules need not be configured or instantiated at any one instance in time. For example, where the computer hardware modules comprise a general-purpose processor configured using software, the general-purpose processor may be configured as respective different components at different times. Software may accordingly configure a processor, for example, to constitute a particular component at one instance of time and to constitute a different component at a different instance of time.

Software and hardware modules can provide information to, and receive information from, other modules. Accordingly, the described modules may be regarded as being communicatively coupled. Where multiple modules, such as those described, exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Electronic Apparatus and System

Example embodiments may be implemented in digital electronic circuitry, in computer hardware, firmware, software, or in combinations of these. Example embodiments may be implemented using a computer program product, e.g., a computer program tangibly embodied in a non-transient manner in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and an apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware, may be a design choice. Below are set out hardware (e.g., machine) and software architectures that may be deployed in various example embodiments.

Thus, methods and systems for application controlled pre-fetch are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A method comprising:

receiving, at a first load balancer over a network from a client machine, a message including a request for an interface and an identifier, the interface being a webpage comprising a first element that is rendered for display by a browser that executes on the client machine, the identifier identifying the webpage for retrieval from a first server;

in response to receiving the message, receiving the interface including the first element configured as a nested interface element and pre-fetch information, over a network, at the first load balancer, the interface and pre-fetch information being received from a first application server, the pre-fetch information including a first element identifier that identifies the first element, the first element comprising a script including a plurality of nested element identifiers that respectively identify a plurality of nested interface elements included in the interface and that respectively identify respective locations on the network of the respective nested interface elements;

sending a response from the first load balancer to the client machine over the network, the response including the interface;

prior to receiving a request for the plurality of nested interface elements included in the interface from the client machine, identifying and requesting at least one nested interface element included in the interface from its respective location on the network;

receiving the at least one nested interface element from a second server by communicating a second message to the second server, the second message including a respective nested element identifier of the pre-fetch information that identifies the at least one nested interface element; and storing the at least one nested interface element in a cache that is accessible to the first load balancer.

2. The method of claim 1, wherein the pre-fetch information is generated and received from the first server.

3. The method of claim 1, further comprising:
receiving a cookie at the first load balancer from the second server, the cookie being associated with the at least one nested interface element;
storing the cookie in association with the at least one nested interface element; and
communicating the cookie to the client machine responsive to receiving a message for the at least one nested interface element from the client machine.

4. The method of claim 1, further comprising:
responsive to receiving a message for the at least one nested interface element from the client machine at the first load balancer, retrieving and transmitting the at least one nested interface element to the client machine.

5. The method of claim 1, wherein identifying the at least one nested interface element comprises determining that the nested element identifiers in the pre-fetch information match a domain associated with the webpage identified for retrieval.

6. The method of claim 1, wherein the plurality of nested element identifiers each comprise a uniform resource locator.

7. The method of claim 1, wherein the at least one nested element interface element-comprises a script including a second element identifier, the second element identifier including a uniform resource locator that identifies a second element that indicates a Joint Photographic Experts Group (JPEG) file.

8. A system comprising:
one or more processors; and
one or more computer-readable media communicatively coupled to the one or more processors and having executable instructions stored thereon that, in response to being executed by the one or more processors, cause the system to perform operations comprising:
receiving, at a first load balancer over a network from a client machine, a message including a request for an interface and an identifier, the interface being a webpage comprising a first element that is rendered for display by a browser that executes on the client machine, the identifier identifying the webpage for retrieval from a first server;
in response to receiving the message, receiving the interface including the first element configured as a nested interface element and pre-fetch information, over a network, at the first load balancer, the interface and pre-fetch information being received from a first application server, the pre-fetch information including a first element identifier that identifies the first element, the first element comprising a script including a plurality of nested element identifiers that respectively identify a plurality of nested interface elements included in the interface and that respectively identify respective locations on the network of the respective nested interface elements;
prior to receiving a request for the plurality of nested interface elements included in the interface from the client machine, identifying and requesting at least one nested interface element included in the interface from its respective location on the network;
receiving the at least one nested interface element from a second server by communicating a second message to a second server, the second message including a respective nested element identifier of the pre-fetch information that identifies the at least one nested interface element; and
storing the at least one nested interface element in a cache that is accessible to the first load balancer.

9. The system of claim 8, wherein the operations further comprise:
sending a response from the first load balancer to the client machine over the network, the response including the interface.

10. The system of claim 8, wherein the operations further comprise:
receiving a cookie at the first load balancer from the second server, the cookie being associated with the at least one nested interface element;
causing the cookie to be stored in association with the at least one nested interface element; and
communicating the cookie to the client machine responsive to receiving a message for the at least one nested interface element from the client machine.

11. The system of claim 8, wherein the operations further comprise:
responsive to receiving a message for the at least one nested interface element from the client machine at the first load balancer, and retrieving and transmitting the at least one nested interface element to the client machine.

12. The system of claim 8, wherein identifying the at least one nested interface element comprises determining that the nested element identifiers in the pre-fetch information match a domain associated with the webpage identified for retrieval.

13. The system of claim 8, wherein the plurality of nested element identifiers each comprise a uniform resource locator.

14. The system of claim 8, wherein the at least one nested element interface element-comprises a script including a second element identifier, the second element identifier including a uniform resource locator that identifies a second element that indicates a Joint Photographic Experts Group (JPEG) file.

15. One or more non-transitory computer-readable media having executable instructions stored thereon that, in response to being executed by one or more processors, cause a system to perform operations comprising:
receiving, at a first load balancer over a network from a client machine, a message including a request for an interface and an identifier, the interface being a webpage comprising a first element that is rendered for display by a browser that executes on the client machine, the identifier identifying the webpage for retrieval from a first server;
in response to receiving the message, receiving the interface including the first element configured as a nested interface element and pre-fetch information, over a network, at the first load balancer, the interface and pre-fetch information being received from a first application server, the pre-fetch information including a first element identifier that identifies the first element, the first element comprising a script including a plurality of nested element identifiers that respectively identify a plurality of nested interface elements included in the interface and that respectively identify respective locations on the network of the respective nested interface elements;

sending a response from the first load balancer to the client machine over the network, the response including the interface;

prior to receiving a request for the plurality of nested interface elements included in the interface from the client machine, identifying and requesting at least one nested interface element included in the interface from its respective location on the network;

receiving the at least one nested interface element from a second server by communicating a second message to a second server, the second message including a respective nested element identifier of the pre-fetch information that identifies the at least one nested interface element; and storing the at least one nested interface element in a cache that is accessible to the first load balancer.

16. The one or more non-transitory computer-readable media of claim 15, wherein the pre-fetch information is generated and received from the first server.

17. The one or more non-transitory computer-readable media of claim 15, wherein the operations further comprise:

receiving a cookie at the first load balancer from the second server, the cookie being associated with the at least one nested interface element;

storing the cookie in association with the at least one nested element; and communicating the cookie to the client machine responsive to receiving a message for the at least one nested interface element from the client machine.

18. The one or more non-transitory computer-readable media of claim 15, wherein the operations further comprise:

responsive to receiving a message for the at least one nested interface element from the client machine at the first load balancer; and retrieving and transmitting the at least one nested interface element to the client machine.

19. The one or more non-transitory computer-readable media of claim 15, wherein identifying the at least one nested interface element comprises determining that the nested element identifiers in the pre-fetch information match a domain associated with the webpage identified for retrieval.

20. The one or more non-transitory computer-readable media of claim 15, wherein the plurality of nested element identifiers each comprise a uniform resource locator.

* * * * *